(No Model.)  7 Sheets—Sheet 1.
R. W. STEWART.
PANORAMIC CAMERA.
No. 509,698. Patented Nov. 28, 1893.
FIG. I.
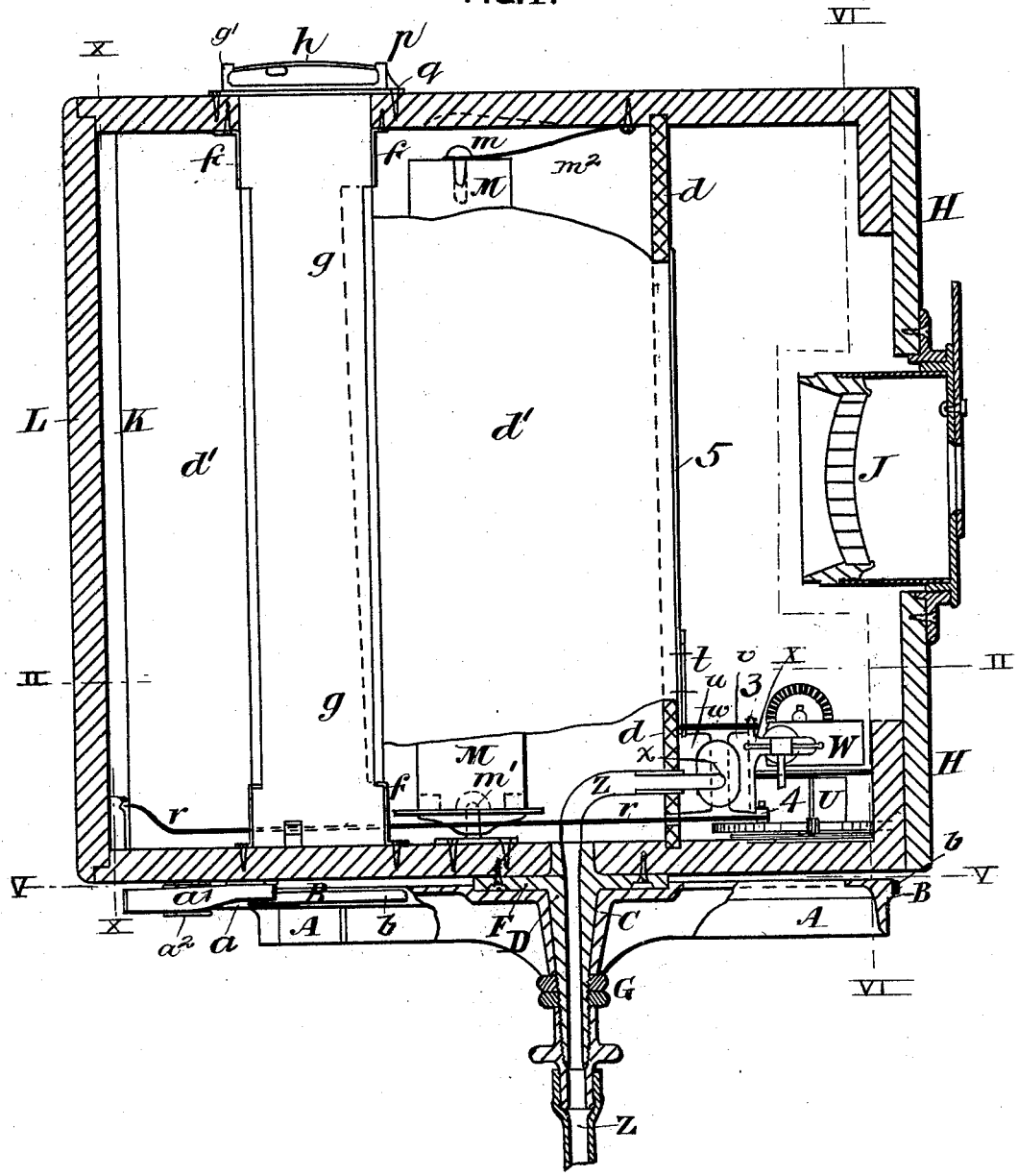
Witnesses:
Walter E. Allen
Edward D. Knight
Inventor:
Richard W. Stewart.
By Knight Bros.
Attorneys (No Model.)  R. W. STEWART.  7 Sheets—Sheet 2.
PANORAMIC CAMERA.
No. 509,698.  Patented Nov. 28, 1893.
FIG. II.
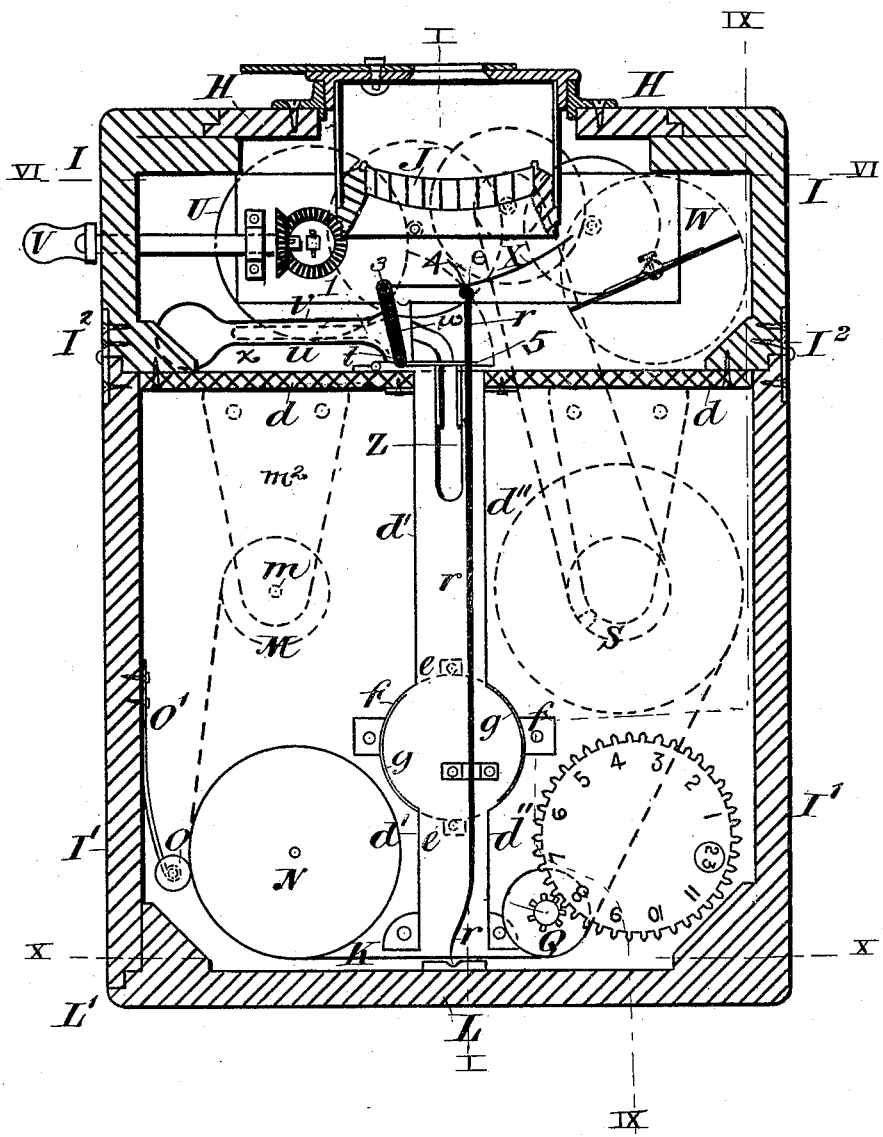

(No Model.) 7 Sheets—Sheet 3.
R. W. STEWART.
PANORAMIC CAMERA.
No. 509,698. Patented Nov. 28, 1893.
FIG. V.
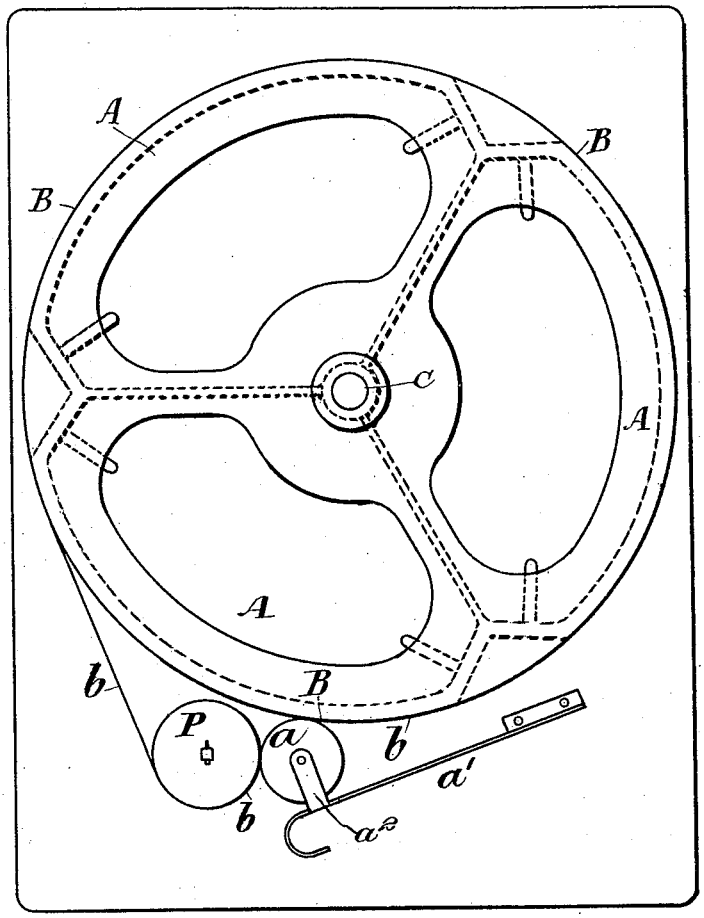
FIG. VII.
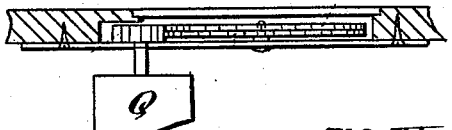
FIG. III.
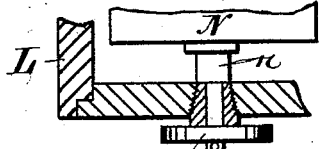
FIG. IV.
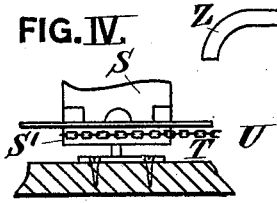
FIG. VIII.
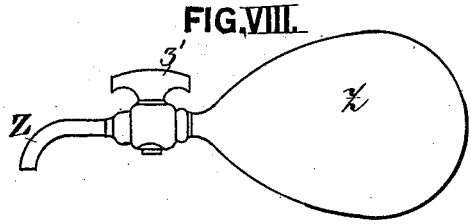
Witnesses:
Walter E. Allen
Edward D. Knight.
Inventor:
Richard W. Stewart.
By Knight Bros.
Attys.
THE NATIONAL LITHOGRAPHING COMPANY,
WASHINGTON, D. C.

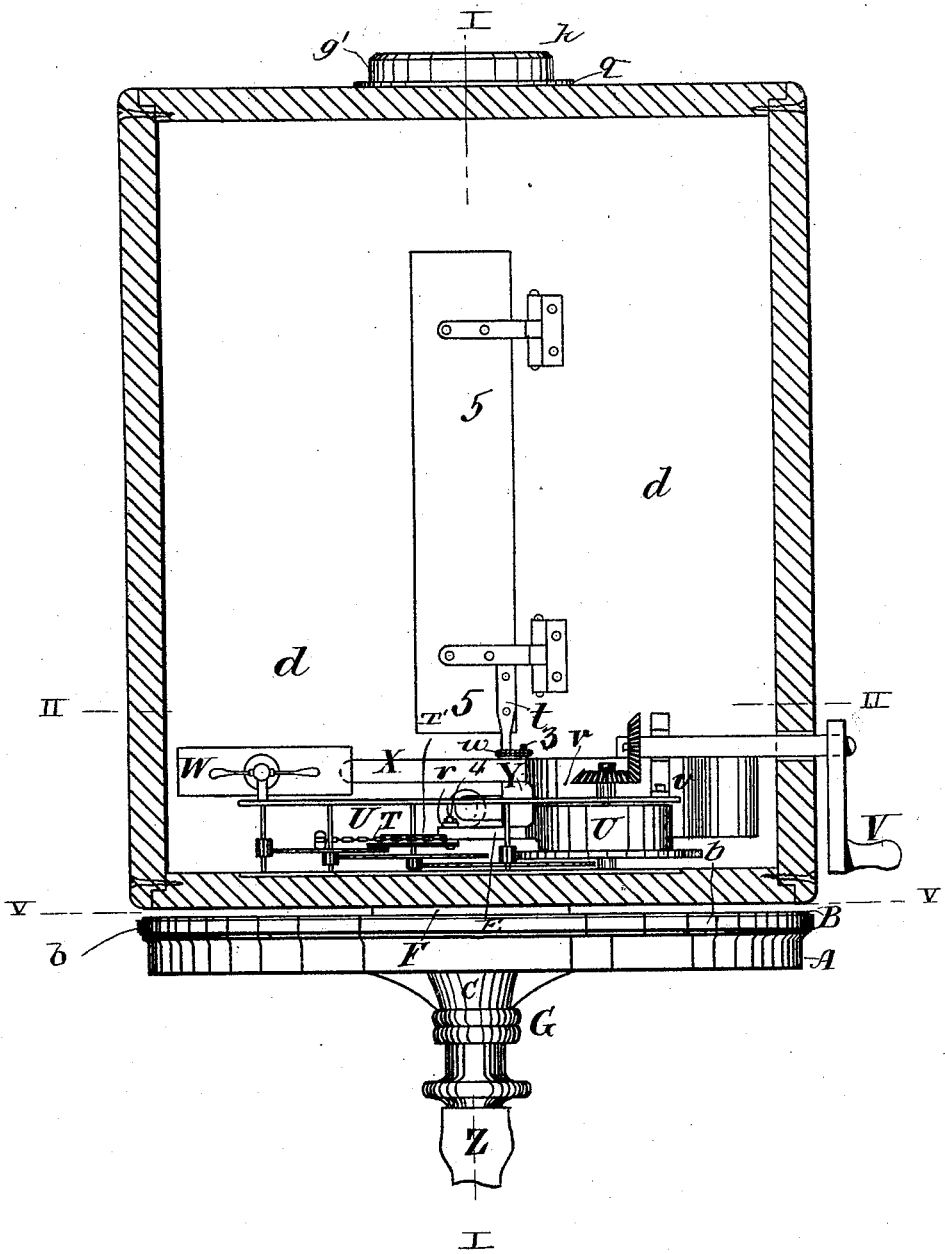

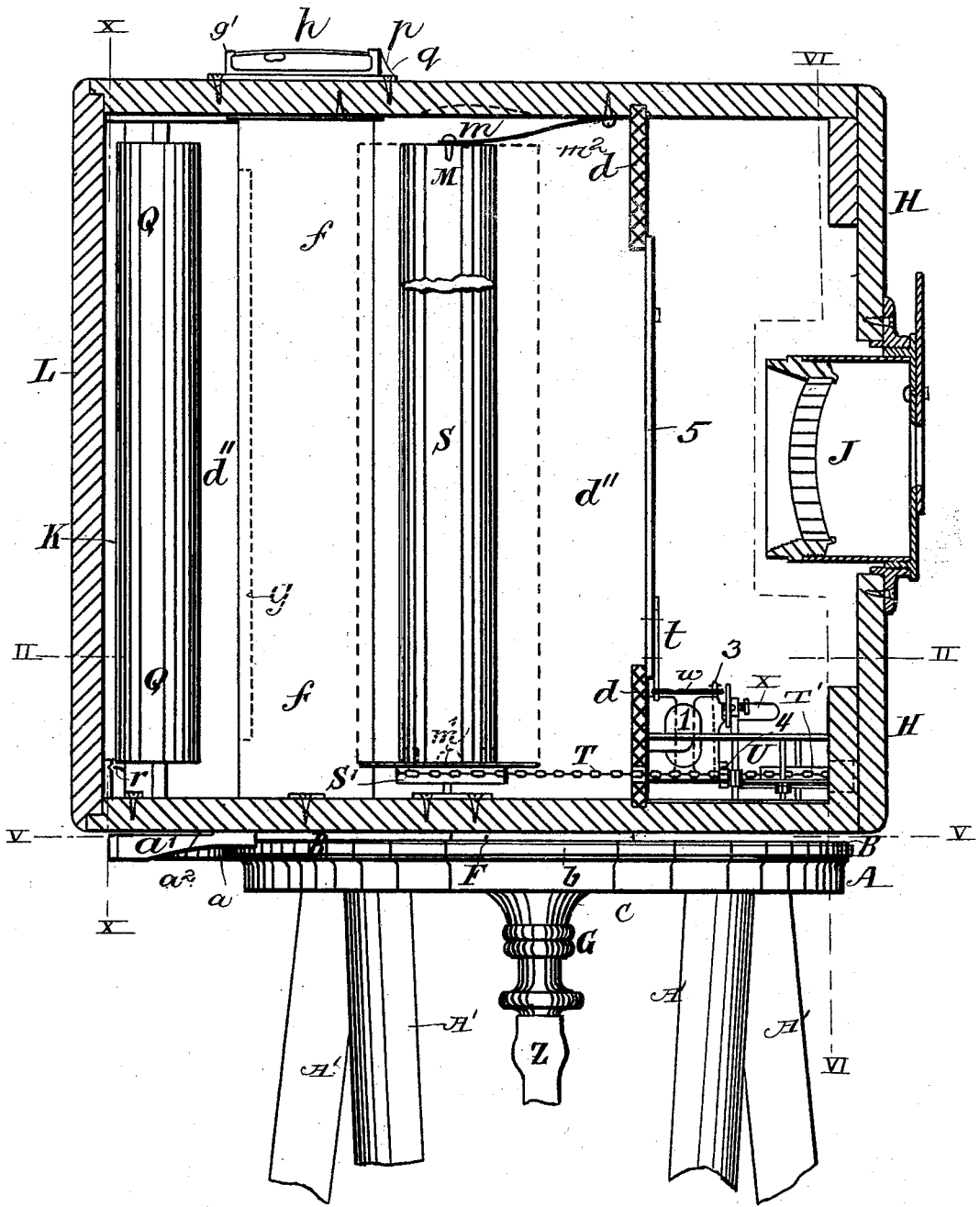

(No Model.) 7 Sheets—Sheet 6.
R. W. STEWART.
PANORAMIC CAMERA.
No. 509,698. Patented Nov. 28, 1893.
FIG. X.
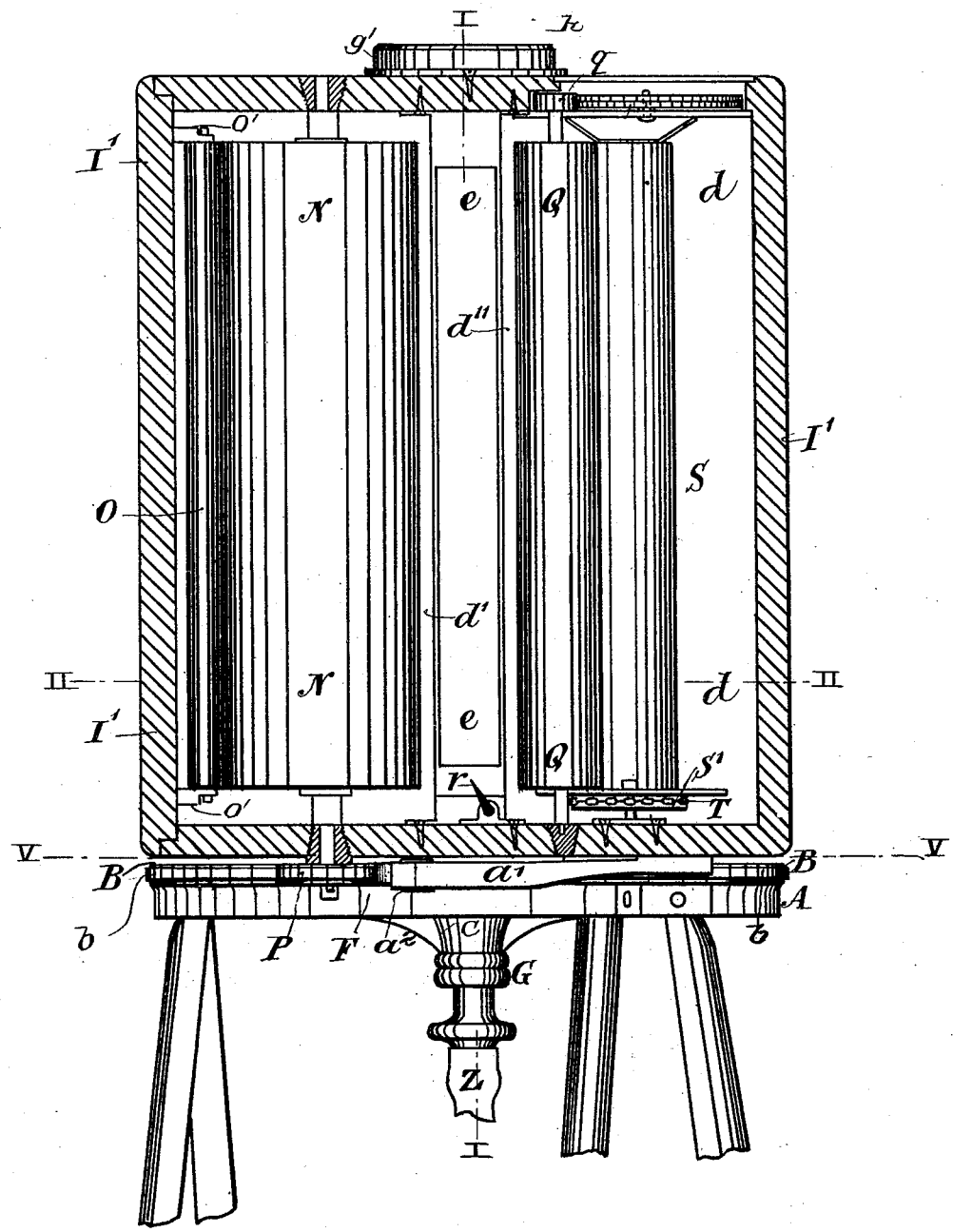
Witnesses:
Walter E. Allen
Edward Knight
Inventor
Richard W. Stewart.
By Knight Bros.
Attys.

(No Model.)
R. W. STEWART.
PANORAMIC CAMERA.
No. 509,698. Patented Nov. 28, 1893.
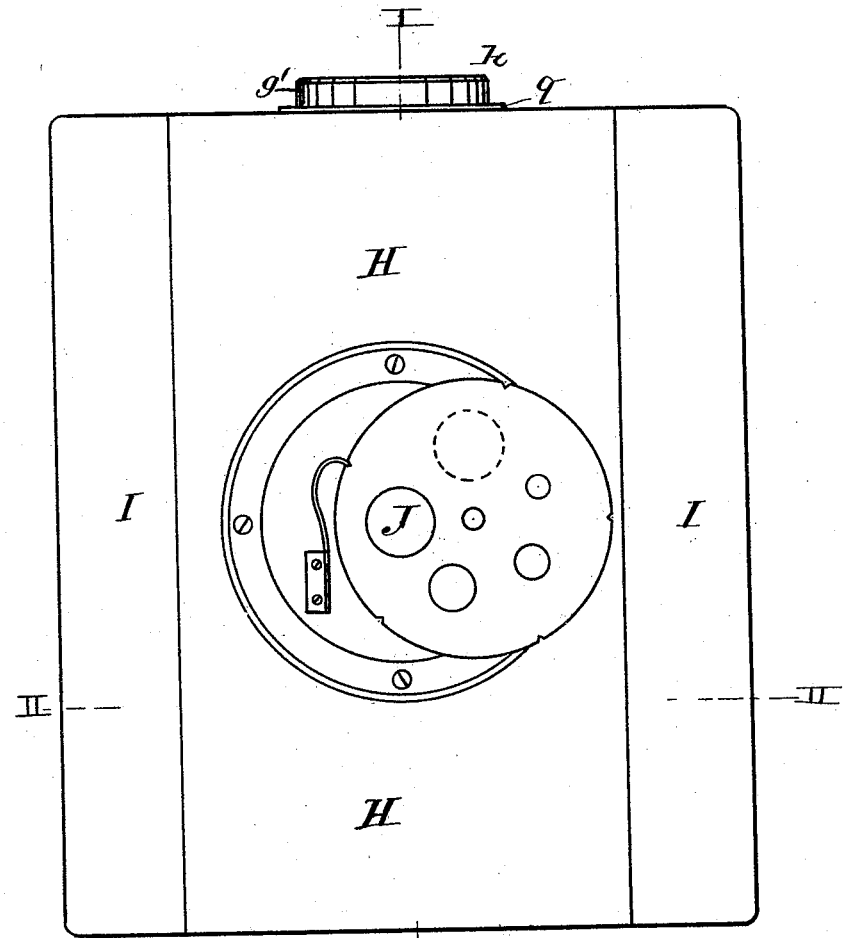
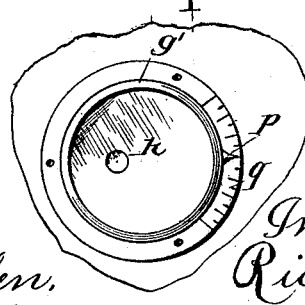

UNITED STATES PATENT OFFICE.

RICHARD W. STEWART, OF DEVONPORT, ENGLAND.

PANORAMIC CAMERA.

SPECIFICATION forming part of Letters Patent No. 509,698, dated November 28, 1893.

Application filed September 16, 1892. Serial No. 446,091. (No model.)

*To all whom it may concern:*

Be it known that I, RICHARD WARREN STEWART, a subject of the Queen of Great Britain, and a resident of Devonport, in the county of Devon, England, have invented certain new and useful Improvements in Panoramic Cameras, of which the following is a specification.

My invention relates to photographic cameras, and particularly to that class in which a roll of sensitive film is employed and passed in rear of a lens. In my improvement, the film is moved in one direction and the whole camera is rotated automatically in unison with, but in the opposite direction to that of the film, so that a sensitive surface is exposed to the rays from a panoramic view of the vicinity, which can be made unlimited in horizontal angle.
My invention consists in novel features of construction as hereinafter described and claimed.

In order that my invention may be fully understood, I will proceed to describe it with reference to the accompanying drawings, in which—

Figure I is a vertical longitudinal section of my improved panoramic camera taken on the line I—I, Figs. II, VI, X and XI through the axis of the lens. Fig. II is a horizontal section taken on the line II—II, Figs. I, VI, IX, X and XI. Fig. III is a detail vertical section of the lower bearing for the roller N. Fig. IV is a detail vertical section of the lower bearing for the roller S. Fig. V is a plan view taken on the line V—V, Figs. I, VI, IX and X. Fig. VI is a vertical transverse section taken on the line VI—VI, Figs. I, II and IX. Fig. VII is a detail vertical section, showing a recording device. Fig. VIII is a side elevation of the pressure bulb. Fig. IX is a vertical longitudinal section taken on the line IX—IX Fig. II. Fig. X is a vertical transverse section taken on the line X—X, Figs. I, II and IX. Fig. XI is a front elevation of the camera. Fig. XII is a detail top view of the head of the rotatable cylinder.

The upper part of a camera stand A' has a circular top A formed with a projecting edge or rim B. The edge B is made of a certain diameter in relation to the other parts, which will be hereinafter referred to. Through the center of this top is formed a socket C to receive a tubular arbor D at right angles to the plane of the top. This arbor has a broad flange F, located at its upper end, provided with screw holes to enable it to be attached by screws to the bottom of the camera. At its lower end, the arbor is loosely mounted in and projects through the socket C and is provided with lock-nuts G, which secure it from displacement, while at the same time it is not prevented from turning freely in the socket. The camera is a rigid box, secured by its base to the flange F, having an adjustable board H, carrying the photographic lens J, the focal plane, represented by the portion marked K, of which, for distant objects, is a short distance in front of the back L of the camera. The top and bottom of the camera, support, in suitable bearings, the upper and lower ends of four vertical rollers M, N, Q, S, the use of which is to carry and guide in the focal plane of the lens, a length of photographic sensitive film. The first roller, M of these rollers, located at the left side of the camera, carries a supply of film and the bearings $m$, $m'$ of this roller are adapted to fit the ends of the spool; the upper bearing $m$ is carried by a spring $m^2$ which presses upon the end of the roller so as to act as a brake. The second roller N, in rear of the first roller M, has guides and the sensitive film held in close frictional contact with it as it is unwound from the roller M by the pressure of a spring roller O, the axle of which is carried by two flat springs O' fixed against the left side of the camera. The spindle $n$ of the second roller N, passes down through the bottom of the camera and has a pulley P fixed on its lower end. This pulley lies in the plane of the edge or rim B and its periphery is similar in form to the edge or rim B of the top A. This third roller Q receives the film from the second roller N, and serves as a guide to keep the film in the focal plane K as also to measure the length of the film that passes along. This measuring is accomplished by means of a pinion located at its upper end which meshes into the wheel of a counter. The film passes from the third roller Q to the fourth roller S; the end of the film being secured to this fourth roller in any convenient manner, so that when the fourth roller is rotated, the film will be wound upon it, preferably with the sensitive surface inward. The lower bearing of the fourth roller has a sprocket wheel S' around which a chain T passes to a sprocket wheel T' which is driven by the clock-work U. This clockwork is fastened to the base of the camera inside and near the front and is driven by a spring as usual that can be wound up by a key V.

The clockwork is controlled by a fly escapement W, the fly being normally blocked by an arm X. This arm forms part of the pneumatic apparatus which consists of an air-tight bag $x$ communicating through the tube Z with the elastic pressure bulb $z$. This bag lies between the arms $u, v$ of a two-armed spring, the arm $u$ being fixed to the camera while the free extremity of the arm $v$ is prolonged into the arms X and E which carry two pins 3 and 4, actuating respectively a link $w$ and a pricker $r$. The pricker is a needle lying in guides along the bottom of the camera between the vertical wings $d', d''$ and having its point raised a little above the lower end of the film, so as to puncture it when pushed back by the motion of the arm E. The link $w$ is connected to an arm $t$ fixed to a shutter 5 hinged to close or open the aperture in the partition $d$.

The pneumatic action is as follows:—Pressure on the elastic bulb $z$, inflates the bag $x$ and moves the arm $v$. This first releases the fly W, secondly opens the shutter 5, and thirdly withdraws the pricker $r$. The spring of the arms is strong enough to reverse this action when the flexible pressure bulb $z$ is allowed to expand. In this way, the whole action is automatic. The edge or rim B of the top and the wheel P are encircled by an endless belt $b$ and against this belt there passes a friction or tension roller $a$ held in bearings $a^2$ located on the free end of a flat spring $a'$, the other end of which is secured to the bottom of the camera.

The action of the apparatus is as follows: The camera is taken into the dark room, and the roll of sensitive film is inserted and fixed in position as already indicated, and the camera is closed and locked. The clockwork is wound up, the roller $a$ is moved away from the contact with the belt $b$ or with the wheel P and the camera is turned round by hand until the lens points toward the left end of the proposed view. The roller $a$ is then freed and allowed to come into contact with the belt $b$, and with the wheel P, and the elastic bulb $z$, is compressed by hand. The clockwork then starts and by means of the sprocket wheel S' and the chain T, causes the roller S to turn and wind up the film. The friction caused by the pressure put on the film by the roller O causes the roller N to rotate and this through the wheel P, roller $a$ and belt $b$ causes the camera to rotate on its axis in the opposite direction to the film. It is found that if the radius of the wheel P plus half the thickness of the belt, has the same ratio to the radius of the roller N that the radius of the edge or rim B has to the equivalent focal length of the lens, then as the camera rotates, the images of objects formed by the lens travel in the focal plane in the same direction and at the same rate as the film, and hence they remain stationary with regard to the sensitive film over a vertical space subtending a small horizontal angle, the result is a perfectly sharp photographic negative in cylindric projection. Between the lens and the film is interposed a vertical transverse partition $d$ having rearwardly extending vertical wings $d'$ $d''$ to screen the rollers M, N, Q, S, from diffused light in the camera, and between the wings is fixed a hollow vertical outer cylinder $f$, having portions of its periphery $e$ cut away at the front and at the back parallel to its axis; the openings thus formed extending far enough in a vertical direction to allow a free passage to the rays passing through the lens. Inside this cylinder $f$, is fitted another rotating cylinder $g$ similarly cut, and the upper end of this inner cylinder passes through the top of the camera and has a head $g'$ and a pointer $p$ by which it can be turned round like the plug of a faucet so as to cut off more or less of the width of opening through the fixed cylinder. The amount of effective opening is shown by the travel of the pointer $p$ over an arc $q$ located on the top of the camera. The head is shown fitted with a circular level $h$.

As the light can be cut off by turning the cylinder $g$ in either direction, advantage is taken of this to adjust the shape of the opening so as to give a different exposure to the sky, than to the foreground, if desired. This is accomplished by cutting one or two of the edges of the cylinder $g$ inclined to the axis, thus giving a wider opening at one end, than at the other end.

Access to the rollers M, N, O and S, is obtained by dividing the camera down both sides I, I, and at the left hand back corner L' and attaching the rear portions I, I' L, by hinges I² to the fixed parts of the sides, the meeting edges being so related that when closed no light can enter. Beside using clips or bolts to secure these parts, I also prefer to use a lock.

The fly can be adjusted by sliding out the adjustable board and passing the hand through the opening.

It is found convenient to have a stop cock $z'$ in the tube Z to relieve the hand during the exposure of the film.

Having thus described my invention, the following is what I claim as new therein and desire to secure by Letters Patent:

1. In a panoramic camera the combination of the box, the supply-roller, the guide-rollers, the winding-roller, clock-mechanism for rotating the winding-roller for advancing the film in one direction, a stand having a top provided with a circular rim, a pulley located beneath the box in the same plane as the rim, and secured to a guide-roller, a belt surrounding the rim and the pulley, and a spring roller bearing on the belt by which the box is moved in unison with, but in the opposite direction to, the moving film; substantially as described.

2. In a panoramic camera the combination of the box a guide-roller having a pulley located beneath the box, a stand having a top provided with a circular rim in the same plane as the pulley, a belt surrounding the rim and the pulley, the flat spring secured to the box, having roller bearings at its free end, and a friction or tension roller mounted in the bearings so as to bear on the belt; substantially as described.

3. In a panoramic camera the combination of the box, the vertical transverse partition having a shutter, the rearwardly extending vertical longitudinal partitions, the vertical outer cylinder, located across the longitudinal partitions, having portions of its periphery cut away at the front and at the back parallel to its axis, and the vertical inner cylinder similarly cut and passing through the top of the box, having a head by which it can be adjusted; substantially as described.

4. In a panoramic camera the combination of the box, the vertical transverse partition having a shutter, the rearwardly extending vertical longitudinal partitions, the vertical outer cylinder located across the longitudinal partitions, having portions of its periphery cut away at the front and at the back parallel to its axis, and the vertical inner cylinder similarly cut having an edge inclined to the axis, and a head, passing through the top of the box, by which it can be adjusted; substantially as described.

5. In a panoramic camera the combination of the box having an opening through the top, a quadrant plate around the opening, the vertical transverse partition having a shutter, the rearwardly extending vertical longitudinal partitions, the vertical outer cylinder located across the longitudinal partitions, having portions of its periphery cut away at the front and at the back parallel to its axis, and the vertical inner cylinder similarly cut, having a head provided with a circular level and with a pointer; substantially as described.

6. In a panoramic camera the combination of the box, a film-support, connections between the film-support and the box for rotating the box, a motor for rotating the film-support, a vertical transverse partition having a shutter, the rearwardly extending vertical longitudinal partitions and the outer and inner apertured cylinders located across the longitudinal partitions; substantially as described.

7. In a panoramic camera the combination of a box, a film-support, a motor having a regulating fly, a vertical transverse partition having a shutter, the spring having a fixed arm, and a movable divided arm, a flexible bag located between the arms, a flexible bulb, a pipe connecting the bulb with the bag, connection between the divided arm and the shutter, a pricker, and connection between the divided arm and the pricker; substantially as described.

R. W. STEWART.

Witnesses:
H. F. BARTLETT,
FRANK. J. HARWOOD.